US012626610B2

(12) United States Patent
Kubota

(10) Patent No.: US 12,626,610 B2
(45) Date of Patent: May 12, 2026

(54) WALKING EVALUATION APPARATUS, WALKING EVALUATION METHOD, AND NON-TRANSITORY STORAGE MEDIUM

(71) Applicant: NEC Corporation, Tokyo (JP)

(72) Inventor: Nanami Kubota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 547 days.

(21) Appl. No.: 18/025,554

(22) PCT Filed: Sep. 18, 2020

(86) PCT No.: PCT/JP2020/035447
§ 371 (c)(1),
(2) Date: Mar. 9, 2023

(87) PCT Pub. No.: WO2022/059165
PCT Pub. Date: Mar. 24, 2022

(65) Prior Publication Data
US 2023/0335004 A1 Oct. 19, 2023

(51) Int. Cl.
*G09B 19/00* (2006.01)
*G06Q 40/08* (2012.01)
(52) U.S. Cl.
CPC ............. *G09B 19/00* (2013.01); *G06Q 40/08* (2013.01)
(58) Field of Classification Search
None
See application file for complete search history.

(56) References Cited

U.S. PATENT DOCUMENTS

2019/0306679 A1  10/2019  Duan et al.
2021/0347383 A1*  11/2021  Siebert ............... G01C 21/3407

FOREIGN PATENT DOCUMENTS

JP  2002-259703 A  9/2002
JP  2005-340947 A  12/2005
JP  2017-049887 A  3/2017
JP  2018-190006 A  11/2018
JP  2020-506460 A  2/2020

OTHER PUBLICATIONS

International Search Report for PCT Application No. PCT/JP2020/035447, mailed on Nov. 24, 2020.
English translation of Written opinion for PCT Application No. PCT/JP2020/035447, mailed on Nov. 24, 2020.

* cited by examiner

*Primary Examiner* — Thomas S Mccormack
(74) *Attorney, Agent, or Firm* — Sughrue Mion, PLLC

(57) ABSTRACT

The present invention provides a walking evaluation apparatus (10) including: a position information acquisition unit (12) that acquires position information indicating a current position of a user during a movement by walking; a traffic rule information acquisition unit (13) that acquires, from a storage unit (17) that stores traffic rule information indicating a traffic rule for each position, the traffic rule information indicating the traffic rule around the current position of the user; a determination material acquisition unit (14) that acquires behavior information indicating a behavior content of the user; a determination unit (15) that determines whether the traffic rule around the current position of the user is observed, based on the behavior information; and an evaluation unit (16) that computes an evaluation value of a way of walking by the user, based on the determination result.

12 Claims, 12 Drawing Sheets

TRAFFIC RULE INFORMATION (1)

| TRAFFIC RULE NUMBER | CONTENT |
|---|---|
| 0001 | CROSS ON GREEN SIGNAL LIGHT, AND PROHIBIT CROSSING ON RED SIGNAL LIGHT |
| 0002 | WALK ON SIDEWALK |
| . . . . . | . . . . . |

FIG. 4

TRAFFIC RULE INFORMATION (2)

| POSITION | TRAFFIC RULE NUMBER |
|---|---|
| $(X_1, Y_1)$ | 0001,1382 |
| $(X_2, Y_2)$ | 0038 |
| $(X_3, Y_3)$ | 0001,0038,3789, $\cdots$ |
| $\vdots$ | $\vdots$ |

FIG. 5

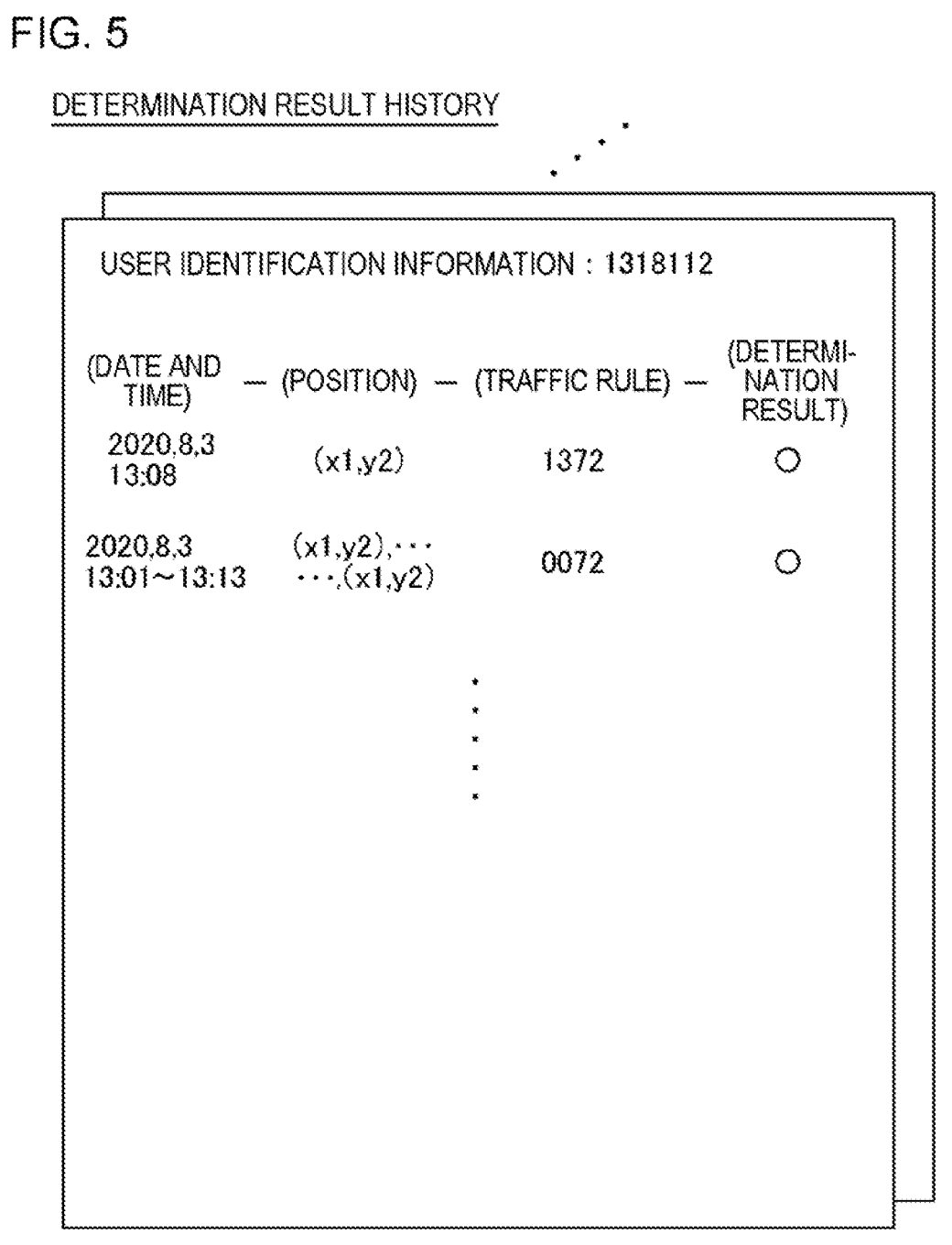

DETERMINATION RESULT HISTORY

. . .

USER IDENTIFICATION INFORMATION : 1318112

| (DATE AND TIME) | — (POSITION) — | (TRAFFIC RULE) — | (DETERMI- NATION RESULT) |
|---|---|---|---|
| 2020.8.3 13:08 | (x1,y2) | 1372 | ◯ |
| 2020.8.3 13:01~13:13 | (x1,y2),··· ···,(x1,y2) | 0072 | ◯ |

EVALUATION VALUE INFORMATION

| USER IDENTIFICATION INFORMATION | EVALUATION VALUE |
|---|---|
| 1318112 | 113 |
| ⋮ | ⋮ |

FIG. 8

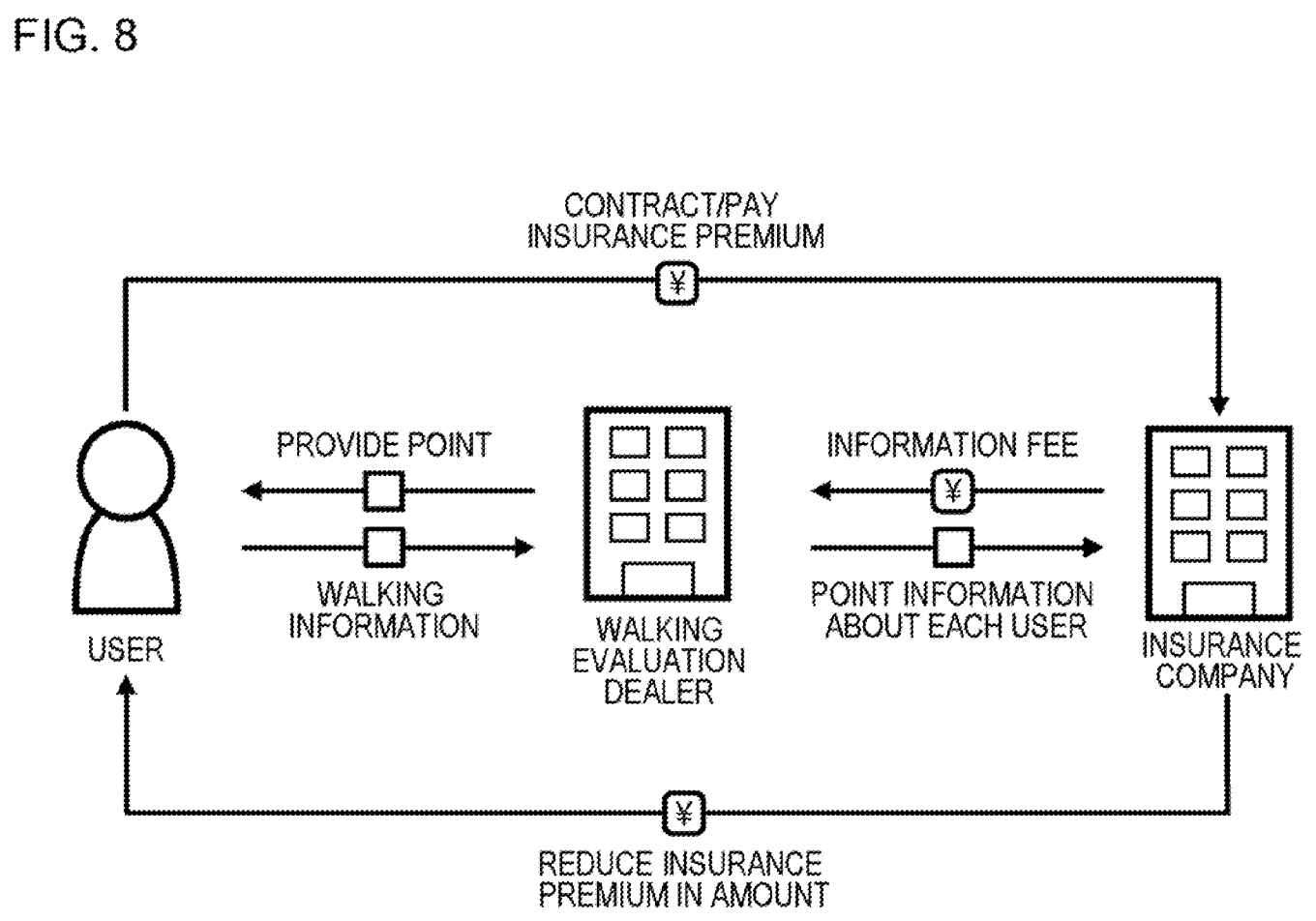

INSURANCE COMPANY

INFORMATION FEE

POINT INFORMATION ABOUT EACH USER

CONTRACT/PAY INSURANCE PREMIUM

WALKING EVALUATION DEALER

REDUCE INSURANCE PREMIUM IN AMOUNT

PROVIDE POINT

WALKING INFORMATION

USER

WALKING EVALUATION APPARATUS, WALKING EVALUATION METHOD, AND NON-TRANSITORY STORAGE MEDIUM

This application is a National Stage Entry of PCT/JP2020/035447 filed on Sep. 18, 2020, the contents of all of which are incorporated herein by reference, in their entirety.

TECHNICAL FIELD

The present invention relates to a walking evaluation apparatus, a walking evaluation method, and a program.

BACKGROUND ART

A technique related to the present invention is disclosed in Patent Documents 1 to 3. Patent Document 1 discloses a technique for evaluating a way of riding a bicycle by a user, and providing a point according to the result. Patent Document 2 discloses a technique for deciding an insurance premium, based on driving history information of an automobile. Patent Document 3 discloses a technique for issuing a warning sound when a traffic violator of a pedestrian or a rider of a bicycle is detected.

RELATED DOCUMENT

Patent Document

[Patent Document 1] Japanese Patent Application Publication No. 2018-190006
[Patent Document 2] Japanese Patent Application Publication No. 2002-259703
[Patent Document 3] Japanese Patent Application Publication No. 2017-049887

DISCLOSURE OF THE INVENTION

Technical Problem

The present invention has a challenge to provide a technique for guiding a pedestrian in such a way that the pedestrian voluntarily actively observes a traffic rule and safely walks.

Solution to Problem

The present invention provides a walking evaluation apparatus including:
a position information acquisition unit that acquires position information indicating a current position of a user during a movement by walking;
a traffic rule information acquisition unit that acquires, from a storage unit that stores traffic rule information indicating a traffic rule for each position, the traffic rule information indicating the traffic rule around the current position;
a determination material acquisition unit that acquires behavior information indicating a behavior content of the user;
a determination unit that determines whether the traffic rule around the current position is observed, based on the behavior information; and
an evaluation unit that computes an evaluation value of a way of walking by the user, based on the determination result.

Further, the present invention provides a walking evaluation method including,
by a computer:
acquiring position information indicating a current position of a user during a movement by walking;
acquiring, from a storage unit that stores traffic rule information indicating a traffic rule for each position, the traffic rule information indicating the traffic rule around the current position;
acquiring behavior information indicating a behavior content of the user;
determining whether the traffic rule around the current position is observed, based on the behavior information; and
computing an evaluation value of a way of walking by the user, based on the determination result.

Further, the present invention provides a program causing a computer to function as:
a position information acquisition unit that acquires position information indicating a current position of a user during a movement by walking;
a traffic rule information acquisition unit that acquires, from a storage unit that stores traffic rule information indicating a traffic rule for each position, the traffic rule information indicating the traffic rule around the current position;
a determination material acquisition unit that acquires behavior information indicating a behavior content of the user;
a determination unit that determines whether the traffic rule around the current position is observed, based on the behavior information; and
an evaluation unit that computes an evaluation value of a way of walking by the user, based on the determination result.

Advantageous Effects of Invention

The present invention achieves a technique for guiding a pedestrian in such a way that the pedestrian voluntarily actively observes a traffic rule and safely walks.

BRIEF DESCRIPTION OF THE DRAWINGS

FIG. 1 is one example of a hardware configuration diagram of a walking evaluation apparatus according to the present example embodiment.

FIG. 2 is one example of a functional block diagram of the walking evaluation apparatus according to the present example embodiment.

FIG. 3 is a diagram schematically illustrating one example of information processed by the walking evaluation apparatus according to the present example embodiment.

FIG. 4 is a diagram schematically illustrating one example of information processed by the walking evaluation apparatus according to the present example embodiment.

FIG. 5 is a diagram schematically illustrating one example of information processed by the walking evaluation apparatus according to the present example embodiment.

FIG. 6 is a diagram schematically illustrating one example of information processed by the walking evaluation apparatus according to the present example embodiment.

FIG. 8 is a diagram illustrating one example of a use form of the walking evaluation apparatus according to the present example embodiment.

DESCRIPTION OF EMBODIMENTS

Figure 7:
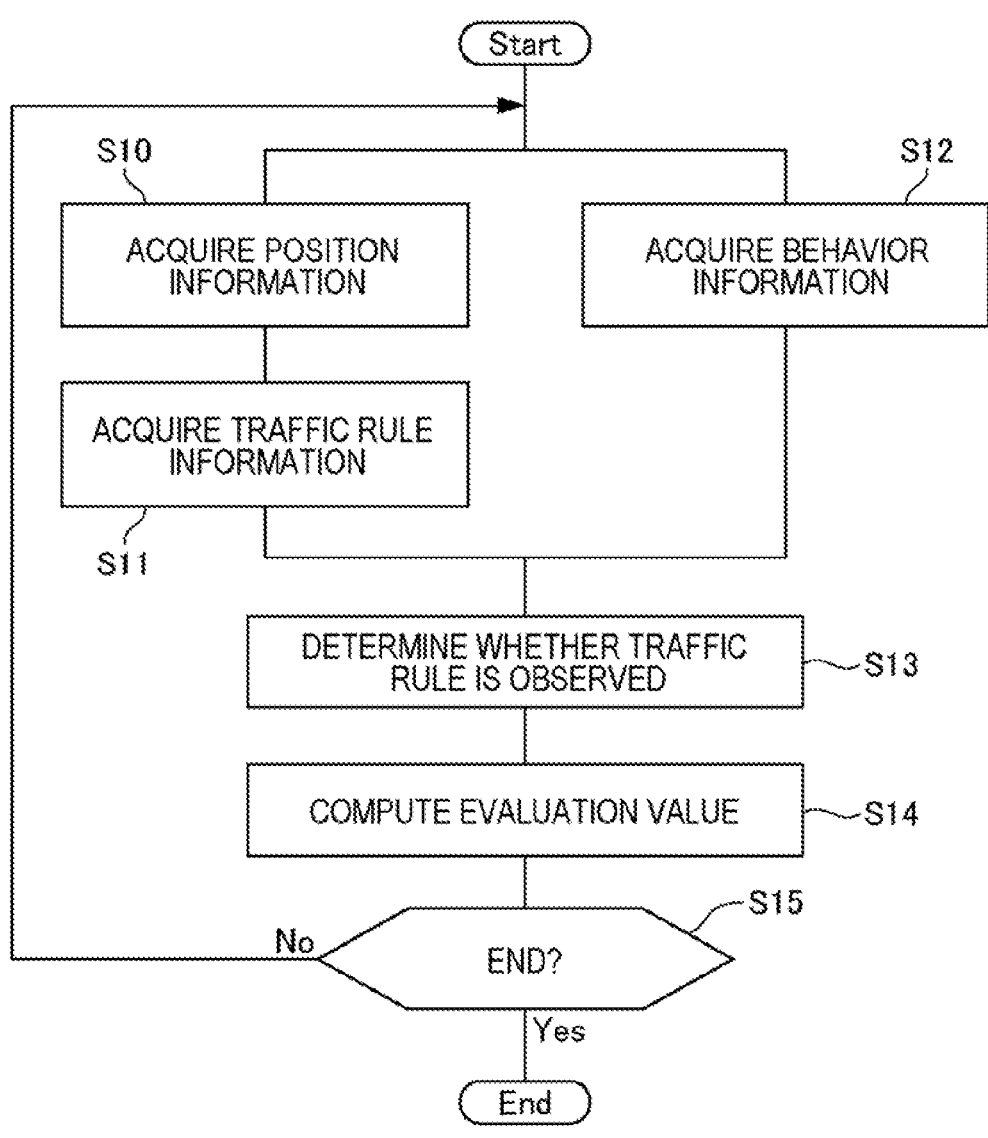
FIG. 7 is a flowchart illustrating one example of a flow of processing of the walking evaluation apparatus according to the present example embodiment.

Hereinafter, example embodiments of the present invention will be described with reference to the drawings. Note that, in all of the drawings, a similar component has a similar reference sign, and description thereof will be appropriately omitted.

First Example Embodiment

"Outline"

When a walking evaluation apparatus according to the present example embodiment acquires position information indicating a current position of a user during a movement by walking, the walking evaluation apparatus acquires traffic rule information indicating a traffic rule around the current position. Further, the walking evaluation apparatus acquires behavior information indicating a behavior content of the user, and determines whether a traffic rule around the current position is observed, based on the behavior information. Then, the walking evaluation apparatus computes an evaluation value of a way of walking by the user, based on the determination result.

Such a walking evaluation apparatus can appropriately determine whether a user during a movement by walking observes a traffic rule in each position. Then, a way of walking by the user can be appropriately evaluated, based on the determination result. The user begins to voluntarily actively observe a traffic rule and safely walk in order to acquire a better evaluation result.

"Configuration"

Next, a configuration of the walking evaluation apparatus will be described. First, one example of a hardware configuration of the walking evaluation apparatus will be described. Each functional unit of the walking evaluation apparatus is achieved by any combination of hardware and software concentrating on a central processing unit (CPU) of any computer, a memory, a program loaded into the memory, a storage unit (that can also store a program downloaded from a storage medium such as a compact disc (CD), a server on the Internet, and the like in addition to a program previously stored at a stage of shipping of an apparatus) such as a hard disk that stores the program, and a network connection interface. Then, various modification examples of an achievement method and an apparatus thereof are understood by a person skilled in the art.

Figure 1:
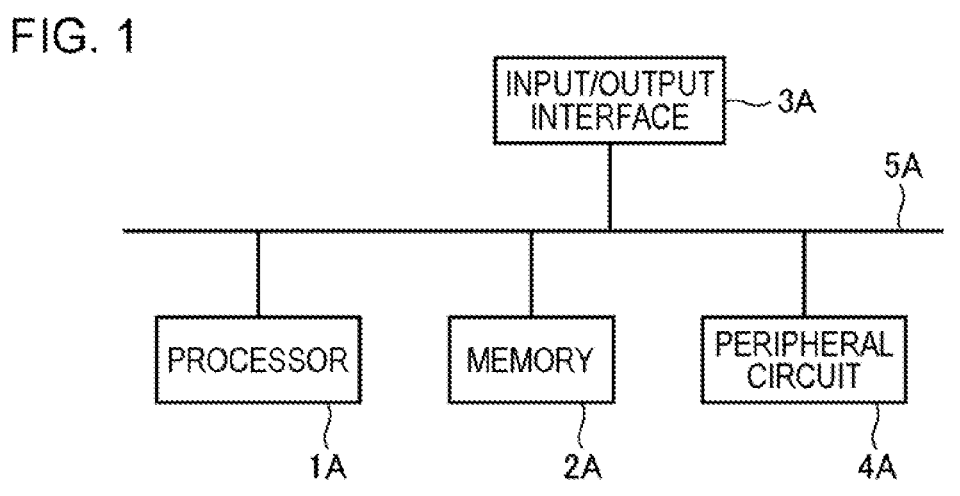

FIG. 1 is a block diagram illustrating the hardware configuration of the walking evaluation apparatus. As illustrated in FIG. 1, the walking evaluation apparatus includes a processor 1A, a memory 2A, an input/output interface 3A, a peripheral circuit 4A, and a bus 5A. Various modules are included in the peripheral circuit 4A. The walking evaluation apparatus may not include the peripheral circuit 4A. Note that, the walking evaluation apparatus may be formed of a plurality of apparatuses separated physically and/or logically, or may be formed of one apparatus integrated physically and/or logically. When the walking evaluation apparatus is formed of a plurality of apparatuses separated physically and/or logically, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

Figure 2:
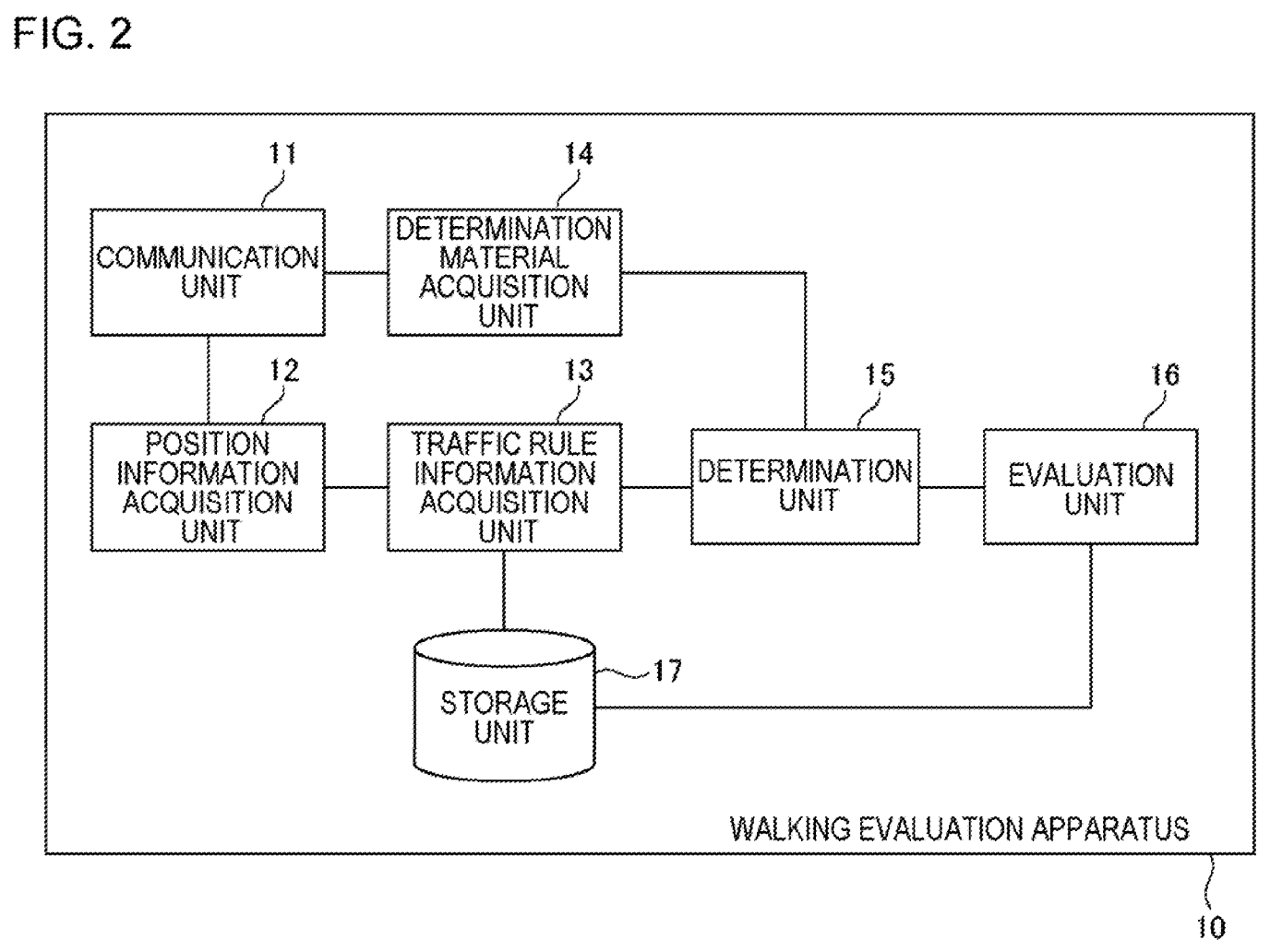

Next, a functional configuration of the walking evaluation apparatus will be described. FIG. 2 illustrates one example of a functional block diagram of a walking evaluation apparatus 10. As illustrated, the walking evaluation apparatus 10 includes a communication unit 11, a position information acquisition unit 12, a traffic rule information acquisition unit 13, a determination material acquisition unit 14, a determination unit 15, an evaluation unit 16, and a storage unit 17.

The communication unit 11 communicates with an external apparatus through wired and/or wireless communication, and acquires various types of information. As the external apparatus, for example, a portable terminal (such as a smartphone, a smartwatch, a cellular phone, and a tablet terminal) of a user, a facility (such as a surveillance camera, a signal light, and a base station) installed on a road, a center apparatus that collects information generated by the facility by communicating with the facility and controls an operation of the facility, and the like are exemplified, which are not limited thereto. Details of information to be acquired are made clear below.

Note that, in the present specification, "acquisition" includes at least any one of "acquisition of data stored in another apparatus or a storage medium by its own apparatus (active acquisition)", based on a user input or an instruction of a program, such as reception by making a request or an inquiry to another apparatus and reading by accessing to another apparatus or a storage medium, "inputting of data output to its own apparatus from another apparatus (passive acquisition)", based on a user input or an instruction of a program, such as reception of data to be distributed (transmitted, push-notified, or the like) and acquisition by selection from among received data or received information, and "generation of new data by editing data (such as texting, sorting of data, extraction of a part of data, and change of a file format) and the like, and acquisition of the new data".

The position information acquisition unit 12 repeatedly (regularly/irregularly) acquires, for a purpose of a walking evaluation, position information indicating a current position of a user during a movement by walking. The position information acquired for the purpose of a walking evaluation is used for acquiring predetermined traffic rule information by the traffic rule information acquisition unit 13 described below.

The "user" is a user of a walking evaluation service provided by the walking evaluation apparatus 10. The user becomes the user of the walking evaluation service by performing necessary processing such as installation of an application into his/her own portable terminal and membership registration.

"During a movement by walking" means a state where a user moves on a road from a certain position toward another position by foot, by running, and the like without using a means such as a bicycle and an automobile. A state where a user stops to wait for a signal light to change or stops for another reason while the user moves from a certain position to another position is also included in a concept of "during a movement by walking".

Hereinafter, one example of an acquisition means for position information will be described.

Example 1 of Acquisition Means for Position Information

In the example, a portable terminal of a user has a function of acquiring position information indicating a current position. As the function, a function using a global positioning system (GPS), a function using identification information (position information) about a base station to be communicated, and the like are exemplified, which are not limited thereto. Then, the position information acquisition unit 12 acquires, via the communication unit 11, the position information acquired by the portable terminal of each user from the portable terminal of each user.

Example 2 of Acquisition Means for Position Information

In the example, a feature value (such as a feature value of a face) of an appearance of each user is registered in advance in the walking evaluation apparatus 10. The position information acquisition unit 12 acquires, from an external apparatus via the communication unit 11, an image (hereinafter a "surveillance camera image") generated by a plurality of surveillance cameras installed on a road. Next, the position information acquisition unit 12 detects a user included in the surveillance camera image by verifying a feature value of an appearance of the person included in the surveillance camera image with a feature value of an appearance of each user being registered in advance. Then, the position information acquisition unit 12 determines that the user is present in an installation position of the surveillance camera that generates the surveillance camera image at a point in time at which the surveillance camera image in which the user is detected is generated. The position information acquisition unit 12 generates position information indicating the content.

The position information acquisition unit 12 repeatedly acquires, for a purpose of a walking evaluation, position information indicating a current position of a user "during a movement by walking". In other words, the position information acquisition unit 12 does not acquire, for a purpose of a walking evaluation, position information indicating a current position of a user not "during a movement by walking". In order to achieve the processing, the position information acquisition unit 12 may include a means for determining whether a user is during a movement by walking. Then, when it is determined that the user is during a movement by walking, acquisition of position information may be performed for a purpose of a walking evaluation.

The position information acquisition unit 12 can perform the determination, based on at least one of a movement velocity being computed based on a time change of position information, an input of a walking movement start/end to a portable terminal possessed by a user, and an analysis result of a surveillance camera image generated by a surveillance camera installed on a road. Hereinafter, one example of the means will be described.

Determination Example 1 of Whether User is During Movement by Walking

In the example, the position information acquisition unit 12 determines that a user is during a movement by walking on a road when the following conditions are satisfied.

Condition 1: A current position of the user is on a road.

Condition 2: A movement velocity of the user is equal to or less than a reference value.

A determination whether the condition 1 is satisfied can be achieved by, for example, acquiring the position information described above from a portable terminal of a user, and verifying a current position indicated by the position information with map information indicating a position of a road. For example, the position information acquisition unit 12 may regularly acquire the position information described above for a purpose of the determination. For acquisition of position information for a purpose of the determination and acquisition of position information for a purpose of a walking evaluation, time intervals, acquisition means, and the like of the acquisition of the position information may be different from each other.

A determination whether the condition 2 is satisfied can be achieved by computing a movement velocity of a user, based on a time change of the position information described above (a time change of a current position), and comparing magnitude between the computed movement velocity and a predetermined reference value. The condition 2 can distinguish between a user during a movement by walking and a user during a movement using a means such as a bicycle and an automobile.

Determination Example 2 of Whether User is During Movement by Walking

In the example, the position information acquisition unit 12 determines that a user is during a movement by walking on a road when the following condition is satisfied in addition to the conditions 1 and 2 described above.

Condition 3: A measurement result of an acceleration sensor included in a portable terminal possessed by the user satisfies a predetermined condition.

A footstep counting function of computing a footstep of a user by using a measurement result of an acceleration sensor has been known. The predetermined condition described above is that a state satisfying a footstep counting condition in the footstep counting function continues (for example: a state where a footstep is counted at a predetermined time interval continues). The footstep counting condition is a condition for counting a footstep (increasing a footstep by 1), and, for example, a value of acceleration in a predetermined direction is equal to or more than a reference value, and the like. The condition 3 can distinguish between a user during a movement by walking and a user during a movement using a means such as a bicycle and an automobile.

Determination Example 3 of Whether User is During Movement by Walking

In the example, a user inputs a walking movement start to his/her own portable terminal at a time of a walking movement start. The portable terminal notifies the walking evaluation apparatus 10 of the input. Further, the user inputs a walking movement end to his/her own portable terminal at a time of a walking movement end. The portable terminal notifies the walking evaluation apparatus 10 of the input. The position information acquisition unit 12 determines that the user is during a movement by walking from a point in time at which the walking movement start is input to a point in time at which the walking movement end is input.

Determination Example 4 of Whether User is During Movement by Walking

In the example, the position information acquisition unit 12 determines that a user is during a movement by walking when the position information acquisition unit 12 detects the user standing on a road from a surveillance camera image generated by a surveillance camera installed on the road.

Determination Example 5 of Whether User is During Movement by Walking

In the example, the position information acquisition unit 12 determines whether a user is during a movement by waking by combining at least two of the plurality of determination examples described above. For example, the walking evaluation apparatus 10 may determine that the user is during a movement by walking when it is determined that the user is during a movement by walking in at least one of the plurality of determination examples.

Note that, herein, the example in which the position information acquisition unit 12 includes the means for determining whether a user is during a movement by walking is described. As a modification example, a portable terminal of a user may determine whether the user is during a movement by walking, based on the determination example 1, 2, 3, or 5. Then, the portable terminal of the user may transmit the determination result to the walking evaluation apparatus 10. Further, the portable terminal of the user may transmit position information for a walking evaluation to the walking evaluation apparatus 10 only while it is determined that the user is during a movement by walking.

The traffic rule information acquisition unit 13 acquires, from the storage unit 17 that stores traffic rule information indicating a traffic rule for each position on a road, the traffic rule information indicating the traffic rule around a current position of a user. A definition of "around" is a design matter, but, for example, the traffic rule information acquisition unit 13 may acquire traffic rule information in an area within a radius R from a current position of a user. The radius R is a predetermined fixed value.

FIGS. 3 and 4 schematically illustrate one example of the traffic rule information. In the information in FIG. 3, a traffic rule number that identifies a plurality of registered traffic rules from one another, and a content of each traffic rule are associated with each other. The content of a traffic rule is "walk on a sidewalk", "pass on a right side of a road", "observe a signal light (cross on a green signal light, and prohibit crossing on a red signal light)", "cross a crosswalk", "do not diagonally cross except for a scramble intersection", "do not cross just in front and rear of an automobile except for during crossing of a crosswalk", "do not cross a place prohibited from crossing indicated by a road sign", "stop just in front of an intersection", "do not cross when a green signal light is flashing", "do not walk while operating a portable terminal", and the like, which are not limited thereto. In the information in FIG. 4, a number (traffic rule number) of a traffic rule needed to be observed in each position is registered for each position on a road.

Returning to FIG. 2, the determination material acquisition unit 14 acquires behavior information indicating a behavior content of a user during a movement by walking. The behavior information includes at least one piece of first behavior information and second behavior information below. Details will be described below.

—First Behavior Information—

The first behavior information indicates at least one of whether a stop is made at a certain moment, whether a move is made at a certain moment, a walking position, and a walking track. Such first behavior information is generated based on at least one of a measurement result of an acceleration sensor included in a portable terminal possessed by a user, position information acquired by a GPS function included in the portable terminal possessed by the user, a communication history between the portable terminal possessed by the user and a base station, and an analysis result of an image generated by a surveillance camera installed on a road.

"Whether a stop is made at a certain moment" and "whether a move is made at a certain moment" may be determined based on a change amount of a current position around a latest predetermined time of the moment indicated by a history of position information, for example. The user may be determined to stop when the change amount around the predetermined time is less than a reference value, and the user may be determined to move when the change amount around the predetermined time is equal to or more than the reference value. As described above, the position information is generated based on a GPS function included in a portable terminal, a communication history between a portable terminal possessed by a user and a base station, an analysis result of an image generated by a surveillance camera installed on a road, and the like.

The "walking position" and the "walking track" are determined based on the position information and a time change of the position information.

—Second Behavior Information—

The second behavior information indicates at least one of presence or absence of an operation performed on a portable terminal possessed by a user, and an operation content. Such second behavior information is generated by the portable terminal possessed by the user.

The operation performed on the portable terminal includes not only an operation on an application related to a walking evaluation service provided by the walking evaluation apparatus 10, but also another operation. The operation content may indicate a "login operation on a predetermined account", "identification information about an operated application", an "operation content performed in an application", and the like.

Note that, the determination material acquisition unit 14 may further acquire display information indicating a display content (such as red, green, and flashing green) at each timing of each of a plurality of signal lights installed on a road in addition to the behavior information described above. The determination material acquisition unit 14 may acquire the display information from each signal light or a center apparatus that controls an operation of a plurality of signal lights, for example. In addition, the determination material acquisition unit 14 may generate the display information by analyzing a surveillance camera image generated in such a way as to include a signal light, and recognizing a display content of the signal light at each timing.

The determination unit 15 determines whether a traffic rule around a current position is observed, based on the behavior information. The determination unit 15 may perform the determination described above, based on the display information described above in addition to the behavior information. Then, the determination unit 15 stores a determination result history in the storage unit 17 for each user. FIG. 5 schematically illustrates one example of the determination result history. In the illustrated example, a date and time, a position of a user at that time, a number of a traffic rule applied to the position, and a determination result at that time are registered in association with one another.

Returning to FIG. 2, the evaluation unit 16 computes an evaluation value of a way of walking by a user, based on a determination result by the determination unit 15. Then, as illustrated in FIG. 6, the evaluation value of each user is stored in the storage unit 17. The evaluation value may be indicated by a numerical value (point) as illustrated, may be indicated by a value on four scales of "excellent, good, normal, and bad", and may be indicated by another reference.

There are various algorithms for computing an evaluation value by the evaluation unit 16, based on a determination result, which are not particularly limited. For example, a point may be added in response to a traffic rule being observed. Then, a point may be subtracted in response to a traffic rule not being observed. Magnitude of a point to be added and subtracted may be different according to a content of a traffic rule. In this case, a point to be added and subtracted is determined in advance for each content of a traffic rule. Then, the evaluation unit 16 performs addition and subtraction according to the rule.

Furthermore, magnitude of a point to be subtracted when "do not walk while operating a portable terminal" is not observed may be different according to an operation content. For example, a point to be subtracted in response to an operation performed on an application in which an operation on a portable terminal and viewing of a screen do not frequently occur, such as a call application, a route guide application, and a music viewing and listening application, may be smaller than a point to be subtracted in response to an operation performed on an application in which an operation on a portable terminal and viewing of a screen frequently occur, such as a mailing application, a Web browser, and a video viewing and listening application. In this case, a point to be subtracted is determined in advance for each operation content. Then, the evaluation unit 16 performs addition and subtraction according to the rule.

Next, one example of a flow of processing of the walking evaluation apparatus 10 will be described by using a flowchart in FIG. 7.

When the processing starts, the position information acquisition unit 12 acquires position information indicating a current position of a user during a movement by walking (S10). Next, the traffic rule information acquisition unit 13 acquires, from the storage unit 17 that stores traffic rule information indicating a traffic rule for each position, the traffic rule information indicating the traffic rule around the current position indicated by the position information acquired in S10 (S11).

Further, when the processing starts, the determination material acquisition unit 14 acquires behavior information indicating a behavior content of the user (S12). In addition, the determination material acquisition unit 14 may further acquire display information indicating a display content at each timing of each of a plurality of signal lights installed on a road.

Then, the determination unit 15 determines whether the traffic rule acquired in S11 is observed, based on the behavior information and the display information that are acquired in S12 (S13). Next, the evaluation unit 16 computes an evaluation value of a way of walking by the user, based on the determination result in S13 (S14).

Hereinafter, the walking evaluation apparatus 10 repeats similar processing.

Advantageous Effect

The walking evaluation apparatus 10 according to the present example embodiment acquires behavior information indicating a behavior content of a user during a movement by walking, and determines whether a traffic rule is observed, based on the behavior information. Then, the walking evaluation apparatus 10 computes an evaluation value of a way of walking by the user, based on the determination result. With such a walking evaluation apparatus 10, a user begins to voluntarily actively observe a traffic rule and safely walk in order to acquire a better evaluation result.

Further, the walking evaluation apparatus 10 can recognize a current position of a user, and acquire traffic rule information indicating a traffic rule around the current position. With such a walking evaluation apparatus 10, a traffic rule that needs to be observed by a user in each position can be accurately recognized.

Second Example Embodiment

In the present example embodiment, an insurance premium of a user is decided based on an evaluation value computed by a walking evaluation apparatus 10. By using FIG. 8, an overview of processing will be described. A user provides walking information including position information and behavior information about himself/herself during a movement by walking to a walking evaluation dealer who manages the walking evaluation apparatus 10. As described in the first example embodiment, the walking evaluation apparatus 10 computes a point (evaluation value), based on the information, and notifies the user.

Further, the walking evaluation dealer notifies an insurance company of a point of each user. The insurance company pays the walking evaluation dealer an information fee as compensation for the point notification. Then, the insurance company computes an insurance premium of each user, based on the point of each user. An insurance may include an accident during a movement by walking in a compensation range.

In the present example embodiment, an evaluation unit 16 computes a privilege to be provided to each user, based on an evaluation value, and notifies the user. In other words, the evaluation unit 16 computes an insurance premium of each user. A computation equation for an insurance premium is provided in advance from an insurance company and stored in the walking evaluation apparatus 10. Examples of a notification means to a user include use of an application and electronic mail.

Herein, a specific example of a method for computing an insurance premium will be described. Note that, the example is merely one example, which is not limited thereto. For example, in a case where a normal price of a monthly insurance premium is 10,000 yen, when a user joins a service to be discounted based on the point described above, the insurance premium starts from 8,000 yen at a 20% discount for each month. Then, a discount rate is increased or reduced according to a point at a point in time of the end of the month. For example, a discount rate may be increased by 1% for each +10 points, and a discount rate may be reduced by 1% for each −10 points. Note that, the point applied to the increase or the reduction of the discount rate becomes invalid at that point in time.

For example, when +53 points are possessed at a point in time of the end of the month, 5% is added to 20% due to service membership, and a 25% discount can be received. Then, when −27 points are possessed at a point in time of the end of the month, 2% is reduced from 20% due to service membership, and an 18% discount can be received. Note that, a fraction may be rounded up, may be rounded down, may be rounded off, or may be left as it is and carried into next month.

Another configuration of the walking evaluation apparatus 10 is similar to that in the first example embodiment.

The walking evaluation apparatus 10 according to the present example embodiment can achieve an advantageous effect similar to that in the first example embodiment. Further, since a privilege according to a point is provided, a user begins to voluntarily actively observe a traffic rule and more safely walk in order to acquire a better evaluation result.

Third Example Embodiment

In the present example embodiment, a shopping point and a coupon that can be used in shopping on an electronic commerce (EC) site and in an actual store are provided according to an evaluation value computed by a walking evaluation apparatus 10. By using FIG. 9, an overview of a processing will be described. A user provides walking information including position information and behavior information about himself/herself during a movement by walking to a walking evaluation dealer who manages the walking evaluation apparatus 10. As described in the first example embodiment, the walking evaluation apparatus 10 computes a point (evaluation value), based on the information, and notifies the user.

Figure 9:
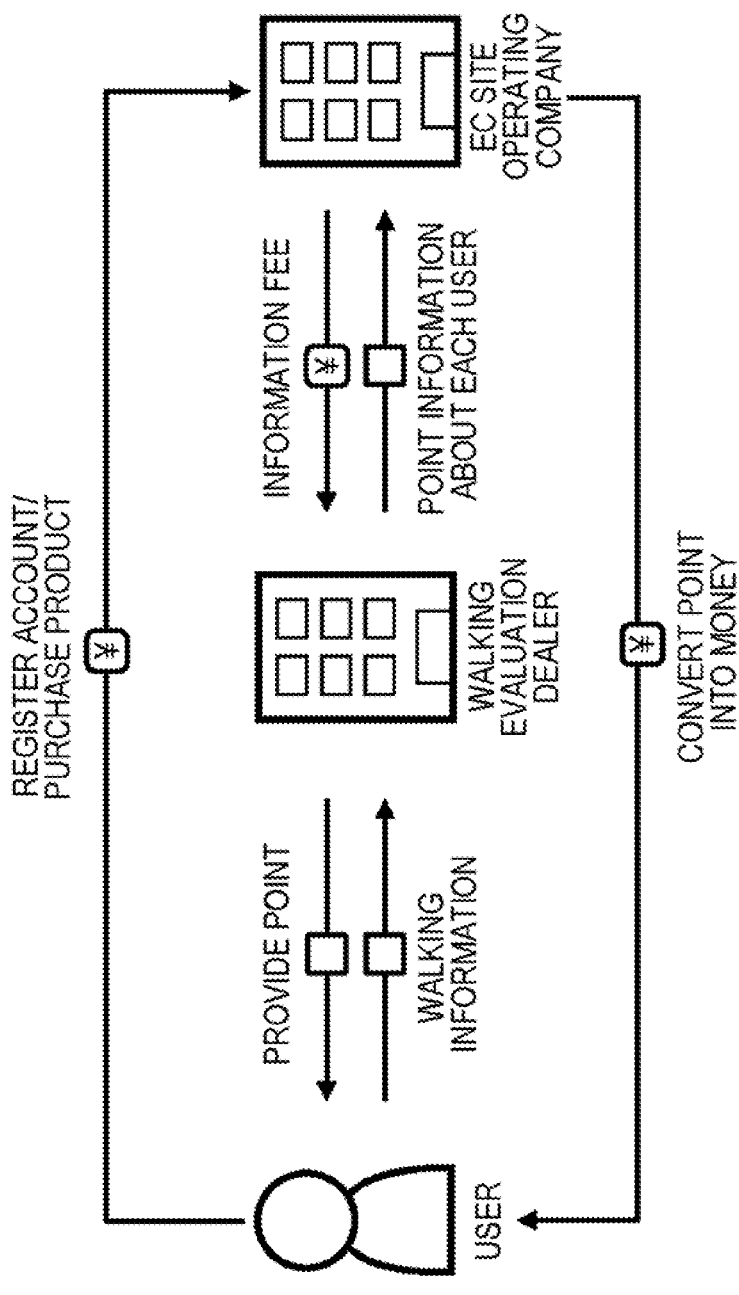
FIG. 9 is a diagram illustrating one example of a use form of the walking evaluation apparatus according to the present example embodiment.

Further, the walking evaluation dealer notifies an entrepreneur (hereinafter an "associated entrepreneur") who issues the shopping point and the coupon described above of a point of each user. As the associated entrepreneur, an EC site operating company, a company that operates an actual store, and the like are exemplified. Note that, FIG. 9 illustrates an EC site operating company as one example. The associated entrepreneur pays the walking evaluation dealer an information fee as compensation for the point notification. Then, the associated entrepreneur computes a shopping point, a coupon to be provided, and the like according to the point, and provides the shopping point, the coupon, and the like to each user.

In the present example embodiment, an evaluation unit 16 computes a privilege to be provided to each user, based on an evaluation value, and notifies the user. In other words, the evaluation unit 16 computes a shopping point and a coupon to be provided to each user. A computation equation for a shopping point and a coupon to be provided is provided in advance from an associated entrepreneur and stored in the walking evaluation apparatus 10. Examples of a notification means to a user include use of an application and electronic mail.

Herein, a specific example of a method for computing a shopping point will be described. Note that, the example is merely one example, which is not limited thereto. For example, when a user joins a service in which a shopping point is provided based on the point (evaluation value) described above, a shopping point according to a point (evaluation value) at a point in time of the end of the month is provided. For example, a shopping point of 100 yen is provided for each +20 points. Note that, a point (evaluation value) provided to the shopping point becomes invalid at that point in time.

For example, when +53 points are possessed at a point in time of the end of the month, a shopping point of 200 yen is provided. Then, when −27 points are possessed at a point in time of the end of the month, a shopping point is not provided. Note that, a fraction may be rounded up, may be rounded down, may be rounded off, or may be left as it is and carried into next month.

Note that, a method for using a point (evaluation value) may be able to be selected by a user. The walking evaluation apparatus 10 provides a plurality of methods for using a point to a user, and receives selection from the plurality of methods. The plurality of methods for using a point are "acquisition of a discount of an insurance premium" described in the second example embodiment, "acquisition of a shopping point that can be used in shopping on an EC site", "acquisition of a shopping point that can be used in shopping in an actual store", "acquisition of a coupon that can be used in shopping on an EC site", and "acquisition of a coupon that can be used in shopping in an actual store" described in the present example embodiment, and the like. Further, an entrepreneur (EC site or actual store) that issues a shopping point and a coupon may be able to be further selected.

The walking evaluation apparatus 10 notifies only an entrepreneur related to a use method selected by a user of a point (evaluation value) of the user, and performs the processing described in the second example embodiment and the present example embodiment.

Another configuration of the walking evaluation apparatus 10 is similar to that in the first example embodiment.

The walking evaluation apparatus 10 according to the present example embodiment can achieve an advantageous effect similar to that in the first example embodiment. Further, since a privilege according to a point is provided, a user begins to voluntarily actively observe a traffic rule and more safely walk in order to acquire a better evaluation result.

Fourth Example Embodiment

Figure 10:
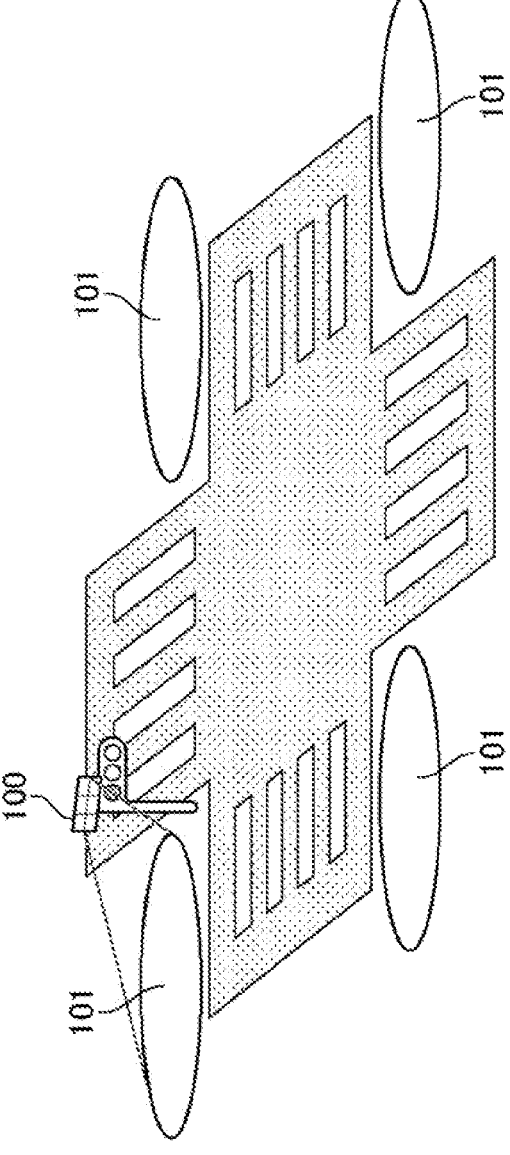
FIG. 10 is a diagram illustrating one example of an example embodiment in which a base station including a beam forming antenna is used.
Figure 11:
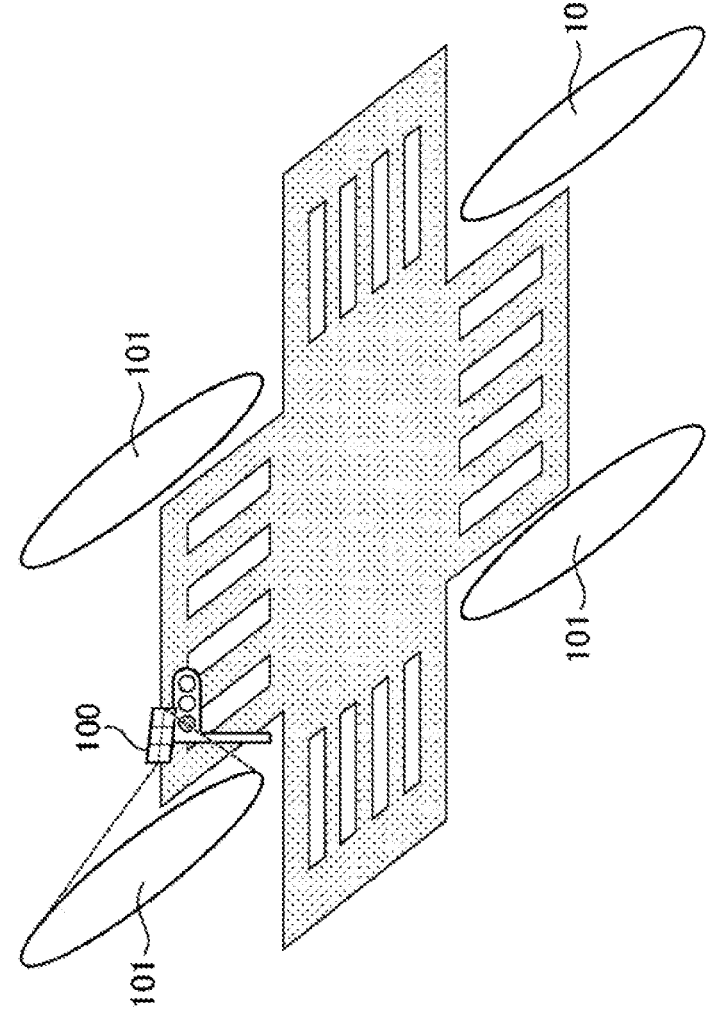
FIG. 11 is a diagram illustrating one example of the example embodiment in which the base station including the beam forming antenna is used.

In the present example embodiment, as illustrated in FIGS. 10 and 11, a base station 100 (for example: a 5G base station) including a beam forming antenna is installed in an installation position of a signal light. Then, a predetermined broadcasting area 101 is generated by using the beam forming antenna. The broadcasting area 101 is an area 101 where an electric wave from the base station 100 can be received. The broadcasting area 101 is an area where a pedestrian who waits for a red signal light to change is assumed to be located. As illustrated in FIGS. 10 and 11, the broadcasting area 101 also switches in response to a change in display of a signal light.

In the present example embodiment, a walking evaluation apparatus 10 transmits a content toward the broadcasting area 101 via the base station 100. A user receives, views, and listens to the content on his/her own portable terminal. The content is a content that can be enjoyed during a wait for a signal light, such as news, an advertisement, a riddle, and a short video. Note that, the content may be linked to display of a signal light. For example, the content may include information indicating a remaining signal light waiting time. Further, an answer for a riddle may be displayed before a predetermined time at which display of a signal light is switched from red to green.

Note that, a means for not displaying a content when a user does not stop may be provided. For example, an application (application installed in a portable terminal) that displays a content received from the base station 100 on a portable terminal may have a function of controlling display/non-display of a content in response to a state (stop/moving) of a user. In addition, the walking evaluation apparatus 10 may detect a state of a user, and transmit a signal for controlling display/non-display of a content to a portable terminal of the user in response to the detection result. For example, a user may view and listen to a content via an application installed in his/her own portable terminal and related to a walking evaluation service. Then, the walking evaluation apparatus 10 may transmit a signal for controlling display/non-display of the content described above to the portable terminal of the user via the application. A stop of a user can be detected by using the method described in the first example embodiment.

Further, in this case, the walking evaluation apparatus 10 may have a function of detecting a user who remains in the broadcasting area 101 until display of a signal light is switched from red to green and continues to view and listen to a content, and adding a point (evaluation value) to the user in response to the detection.

Another configuration of the walking evaluation apparatus 10 is similar to that in the first to third example embodiments.

The walking evaluation apparatus 10 according to the present example embodiment can achieve an advantageous effect similar to that in the first to third example embodiments. Further, with the walking evaluation apparatus 10, a user can view and listen to a content by remaining in the broadcasting area 101. A user begins to voluntarily actively observe a traffic rule (observe a signal light) and more safely walk in order to enjoy a content.

Fifth Example Embodiment

Figure 12:
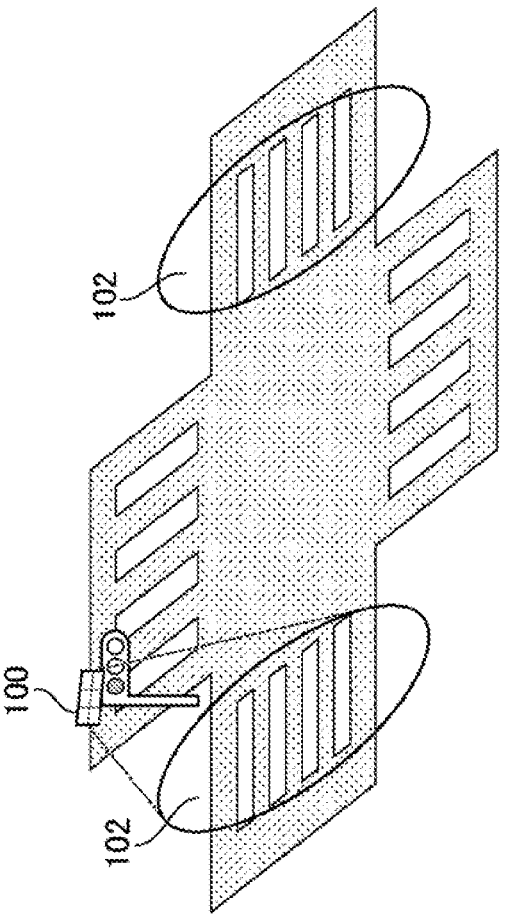
FIG. 12 is a diagram illustrating one example of an example embodiment in which a base station including a beam forming antenna is used.

In the present example embodiment, as illustrated in FIG. 12, a base station 100 (for example: a 5G base station) including a beam forming antenna is installed in an installation position of a signal light. Then, a communication area 102 along a crosswalk is generated at a good timing for crossing the crosswalk. The communication area 102 is an area where an electric wave from the base station 100 can be received. The communication area 102 also switches in response to a change in display of a signal light.

In the present example embodiment, a user who has crossed a crosswalk when a signal light is green is detected based on a communication history between such a base station 100 and a portable terminal of the user. Then, a walking evaluation apparatus 10 increases an evaluation value of the user (for example, adds a point) in response to the detection of crossing when the signal light is green.

Another configuration of the walking evaluation apparatus 10 is similar to that in the first to fourth example embodiments.

The walking evaluation apparatus 10 according to the present example embodiment can achieve an advantageous effect similar to that in the first to fourth example embodiments. Further, the walking evaluation apparatus 10 according to the present example embodiment can detect, by a characteristic technique, a user who has crossed a crosswalk when a signal light is green.

A part or the whole of the above-described example embodiments may also be described as in supplementary notes below, which is not limited thereto.

1. A walking evaluation apparatus, including:
a position information acquisition unit that acquires position information indicating a current position of a user during a movement by walking;
a traffic rule information acquisition unit that acquires, from a storage unit that stores traffic rule information indicating a traffic rule for each position, the traffic rule information indicating the traffic rule around the current position;
a determination material acquisition unit that acquires behavior information indicating a behavior content of the user;
a determination unit that determines whether the traffic rule around the current position is observed, based on the behavior information; and
an evaluation unit that computes an evaluation value of a way of walking by the user, based on the determination result.

2. The walking evaluation apparatus according to supplementary note 1, wherein
the behavior information indicates at least one of whether a stop is made at a certain moment, whether a move is made at a certain moment, a walking position, and a walking track.

3. The walking evaluation apparatus according to supplementary note 2, wherein
the behavior information is generated based on at least one of a measurement result of an acceleration sensor included in a portable terminal possessed by the user, the position information acquired by a global positioning system (GPS) function included in a portable terminal possessed by the user, a communication history between a portable terminal possessed by the user and a base station, and an analysis result of an image generated by a surveillance camera installed on a road.

4. The walking evaluation apparatus according to any of supplementary notes 1 to 3, wherein
the behavior information indicates at least one of presence or absence of an operation performed on a portable terminal possessed by the user, and an operation content.

5. The walking evaluation apparatus according to supplementary note 4, wherein
the behavior information is generated by a portable terminal possessed by the user.

6. The walking evaluation apparatus according to supplementary note 1, wherein
the determination material acquisition unit further acquires display information indicating a display content at each timing of each of a plurality of signal lights installed on a road, and
the determination unit determines whether the traffic rule around the current position is observed, based on further the display information.

7. The walking evaluation apparatus according to any of supplementary notes 1 to 6, wherein the position information acquisition unit determines whether the user is during a movement by walking, based on at least one of a movement velocity being computed based on a time change of the position information, a measurement result of an acceleration sensor included in a portable terminal possessed by the user, an input of a walking movement start/end to a portable terminal possessed by the user, and an analysis result of an image generated by a surveillance camera installed on a road, and acquires the position information indicating the current position of the user being determined to be during a movement by walking.

8. The walking evaluation apparatus according to any of supplementary notes 1 to 7, wherein the evaluation unit computes a privilege to be provided to the user, based on the evaluation value.

9. The walking evaluation apparatus according to any of supplementary notes 1 to 8, wherein the user receives, views, and listens to a content transmitted from a base station on a portable terminal, and the evaluation unit computes the evaluation value in response to viewing and listening of the content.

10. The walking evaluation apparatus according to any of supplementary notes 1 to 9, further including:

a unit that transmits a content to a portable terminal of the user via a base station; and a unit that transmits, to the portable terminal, a signal for controlling display/non-display of the content in response to a state of the user.

11. The walking evaluation apparatus according to supplementary note 9 or 10, wherein a distribution area of a content transmitted from the base station changes in response to a display change in a signal light.

12. A walking evaluation method, including, by a computer:

acquiring position information indicating a current position of a user during a movement by walking;

acquiring, from a storage unit that stores traffic rule information indicating a traffic rule for each position, the traffic rule information indicating the traffic rule around the current position;

acquiring behavior information indicating a behavior content of the user;

determining whether the traffic rule around the current position is observed, based on the behavior information; and computing an evaluation value of a way of walking by the user, based on the determination result.

13. A program causing a computer to function as:

a position information acquisition unit that acquires position information indicating a current position of a user during a movement by walking;

a traffic rule information acquisition unit that acquires, from a storage unit that stores traffic rule information indicating a traffic rule for each position, the traffic rule information indicating the traffic rule around the current position;

a determination material acquisition unit that acquires behavior information indicating a behavior content of the user;

a determination unit that determines whether the traffic rule around the current position is observed, based on the behavior information; and an evaluation unit that computes an evaluation value of a way of walking by the user, based on the determination result.

REFERENCE SIGNS LIST

10 Walking evaluation apparatus
11 Communication unit
12 Position information acquisition unit
13 Traffic rule information acquisition unit
14 Determination material acquisition unit
15 Determination unit
16 Evaluation unit
17 Storage unit
100 Base station
101 Broadcasting area
102 Communication area
1A Processor
2A Memory
3A Input/output interface
4A Peripheral circuit
5A Bus

The invention claimed is:

1. A walking evaluation apparatus, comprising:

at least one memory configured to store one or more instructions; and at least one processor configured to execute the one or more instructions to:

acquire position information indicating a current position of a user during a movement by walking;

acquire, from storage unit that stores traffic rule information indicating a traffic rule for each position, the traffic rule information indicating the traffic rule around the current position;

acquire behavior information indicating a behavior content of the user;

determine whether the traffic rule around the current position is observed, based on the behavior information; and compute an evaluation value of a way of walking by the user, based on the determination result, wherein the behavior information indicates at least one of presence or absence of an operation performed on a portable terminal possessed by the user, and an operation content.

2. The walking evaluation apparatus according to claim 1, wherein the behavior information indicates at least one of whether a stop is made at a certain moment, whether a move is made at a certain moment, a walking position, and a walking track.

3. The walking evaluation apparatus according to claim 2, wherein the behavior information is generated based on at least one of a measurement result of an acceleration sensor included in a portable terminal possessed by the user, the position information acquired by a global positioning system (GPS) function included in a portable terminal possessed by the user, a communication history between a portable terminal possessed by the user and a base station, and an analysis result of an image generated by a surveillance camera installed on a road.

4. The walking evaluation apparatus according to claim 1, wherein the behavior information is generated by a portable terminal possessed by the user.

5. The walking evaluation apparatus according to claim 1, wherein the processor is further configured to execute the one or more instructions to acquire display information indicating a display content at each timing of each of a plurality of signal lights installed on a road, and determine whether the traffic rule around the current position is observed, based on further the display information.

6. The walking evaluation apparatus according to claim 1, wherein the processor is further configured to execute the one or more instructions to determine whether the user is during a movement by walking, based on at least one of a movement velocity being computed based on a time change of the position information, a measurement result of an acceleration sensor included in a portable terminal possessed by the user, an input of a walking movement start/end to a portable terminal possessed by the user, and an analysis result of an image generated by a surveillance camera installed on a road, and acquire the position information indicating the current position of the user being determined to be during a movement by walking.

7. The walking evaluation apparatus according to claim 1, wherein the processor is further configured to execute the one or more instructions to compute a privilege to be provided to the user, based on the evaluation value.

8. The walking evaluation apparatus according to claim 1, wherein the user receives, views, and listens to a content transmitted from a base station on a portable terminal, and the processor is further configured to execute the one or more instructions to compute the evaluation value in response to viewing and listening of the content.

9. The walking evaluation apparatus according to claim 1, wherein the processor is further configured to execute the one or more instructions to:

transmit a content to a portable terminal of the user via a base station; and transmit, to the portable terminal, a signal for controlling display/non-display of the content in response to a state of the user.

10. The walking evaluation apparatus according to claim 8, wherein a distribution area of a content transmitted from the base station changes in response to a display change in a signal light.

11. A walking evaluation method, comprising, by a computer:

acquiring position information indicating a current position of a user during a movement by walking;

acquiring, from storage unit that stores traffic rule information indicating a traffic rule for each position, the traffic rule information indicating the traffic rule around the current position;

acquiring behavior information indicating a behavior content of the user;

determining whether the traffic rule around the current position is observed, based on the behavior information; and computing an evaluation value of a way of walking by the user, based on the determination result, wherein the behavior information indicates at least one of presence or absence of an operation performed on a portable terminal possessed by the user, and an operation content.

12. A non-transitory storage medium storing a program causing a computer to:

acquire position information indicating a current position of a user during a movement by walking;

acquire, from storage unit that stores traffic rule information indicating a traffic rule for each position, the traffic rule information indicating the traffic rule around the current position;

acquire behavior information indicating a behavior content of the user;

determine whether the traffic rule around the current position is observed, based on the behavior information; and compute an evaluation value of a way of walking by the user, based on the determination result, wherein the behavior information indicates at least one of presence or absence of an operation performed on a portable terminal possessed by the user, and an operation content.

* * * * *